United States Patent [19]

Goldfarb et al.

[11] 3,791,879

[45] Feb. 12, 1974

[54] SOLDER FLUX COMPOSITION

[75] Inventors: Harold Goldfarb, Walnut; Christopher Valsamakis, Huntington Beach, both of Calif.

[73] Assignee: North American Rockwell Corporation, El Segundo, Calif.

[22] Filed: May 21, 1973

[21] Appl. No.: 361,917

Related U.S. Application Data

[63] Continuation of Ser. No. 201,138, Nov. 22, 1971, abandoned.

[52] U.S. Cl. .................................. 148/23, 260/635
[51] Int. Cl. ...................... B23r 35/34, C07c 29/00
[58] Field of Search ................ 148/22, 23; 260/635

[56] References Cited
UNITED STATES PATENTS

| | | | |
|---|---|---|---|
| 3,436,278 | 4/1969 | Poliak | 148/23 |
| 2,664,371 | 12/1953 | Snell | 148/23 |
| 2,547,771 | 4/1951 | Pessel | 148/23 |
| 2,992,949 | 7/1961 | Melchiors | 148/23 |
| 3,175,932 | 3/1965 | Brady | 148/23 |
| 2,829,998 | 4/1958 | Glynn | 148/23 |
| 3,575,738 | 4/1971 | Becker | 148/23 |
| 2,801,196 | 7/1957 | Doerr | 148/23 |
| 3,003,901 | 10/1961 | Marcell | 148/23 |
| 1,663,004 | 3/1928 | Green | 148/23 |
| 3,330,028 | 7/1967 | Elbreder | 148/23 |

*Primary Examiner*—L. Dewayne Rutledge
*Assistant Examiner*—Peter D. Rosenberg
*Attorney, Agent, or Firm*—L. Lee Humphries; H. Fredrick Hamann; G. Donald Weber, Jr.

[57] ABSTRACT

A fluxing composition suitable for soldering electrical connections and characterized by producing a bright and shiny solder joint comprising about 40 to 65 percent by weight of polypropylene glycol and 35 to 60 percent by weight rosin.

1 Claim, No Drawings

SOLDER FLUX COMPOSITION

This is a continuation, of application Ser. No. 201,138 filed Nov. 22, 1971 and now abandoned.

The invention herein described was made in the course of or under a contract or subcontract thereunder, with the United States Air Force.

FIELD OF THE INVENTION

This invention relates to soldering fluxes and more particularly to fluxing compositions containing polypropylene glycol.

BRIEF DESCRIPTION OF PRIOR ART

In soldering electrical connections the basic difficulty to be overcome is the removal of an oxide film which is formed on the surface of the metal and which therefore interferes with the wetting of the underlying metal by the solder. In order to establish a metal to metal contact between the metal being soldered and the solder, the oxide film must be removed either mechanically or chemically. The function of the fluxing composition is its use as a chemical means for removing the oxide film.

One of the primary problems with prior art flux composition is the splattering of the flux and/or solder which is caused by the violent volatilization of the flux composition when heated. Many commercially available solder fluxes utilize vehicles having low boiling points such as water, isopropyl alcohol, turpentine and the like. These low boiling point vehicles volatilize below the melting temperature range of the soft solders commonly used, that is, 120° to 310°C.

Another problem encountered with flux compositions is the tendency to leave a corrosive residue on electrical connections. The residues are formed when the flux vehicle vaporizes during the soldering steps. Such residues tend to promote electrolytic corrosion between the solder and the metal and may thus cause ultimate failure of the joint under unfavorable atmospheric conditions. Furthermore, in many cases it is difficult and impractical to wash or otherwise remove the flux residue. As a result, considerable effort has been made to provide flux compositions that leave non-corrosive residues or no residues at all or residues which can be readily removed by washing with organic solvents and/or water.

SUMMARY OF THE INVENTION

It is a primary object of this invention to provide an improved flux composition for soldering.

It is another object of this invention to provide a substantially splatter-free flux composition.

It is still another object of this invention to provide a flux composition which remains substantially liquid during the soldering step thereby facilitating its removal.

These and other objects of this invention are provided by a fluxing composition comprising 40 to 65 weight percent polypropylene glycol having a molecular weight range between 400 to 4,000 and 35 to 60 weight percent rosin. This fluxing composition is substantially free of splattering during the soldering operation, remains liquid after the soldering operation thereby facilitating its removal from the soldered connection and produces a bright and shiny solder joint which is substantially free of imperfections including gas pockets or internal voids.

DETAILED DESCRIPTION OF THE EMBODIMENT

In general, this invention covers fluxing compositions containing 40 to 65 percent by weight of a polypropylene glycol having a molecular weight range between 400 to 4,000 and 35 to 60 percent by weight rosin.

Polypropylene glycol is sold commercially as 1,2-propane-diol. The average molecular weight range is from 400 to 4,000. Higher molecular weights polypropylene glycols tend to be hygroscopic making them unsuitable as a fluxing composition vehicle. These polypropylene glycols have a boiling point of decomposition at temperatures from 300° to 450°C. The viscosities of these polypropylene glycols range from between 70 to 1150 centistokes at 25°C. The polypropylene glycols used in these fluxing compositions are non-toxic, substantially non-hygroscopic and remain liquid within the melting temperature range of 120° to 310°C commonly found for soft solders. The preferred concentration range of polypropylene glycol is 55 to 60 weight percent.

The second component in the fluxing composition is rosin. The concentration of rosin is from about 35 to 60 weight percent. The preferred concentration is about 40 weight percent. Fluxing compositions which have a relatively low rosin concentration, i.e., about 35 to 40 weight percent, can be readily removed by washing with water. Fluxing compositions containing a significant amount of rosin, i.e. about 55 to 60 weight percent, yield a residue which is more readily removed by washing with organic solvents.

The fluxing composition removes the oxide film from the metal to be soldered. At the same time, the fluxing composition protects the solder during the soldering operation to produce a bright shiny solder joint which is substantially free of internal gas pockets. The fluxing composition is substantially free of low-boiling solvents and hence does not cause any splattering during the soldering operation. The flux is a liquid and remains so during and after the soldering step. The liquid flux residue can be readily removed by washing with water and an organic solvent.

EXAMPLE 1

A mixture containing 60 grams polypropylene glycol having a molecular weight of 1010 and 40 grams of rosin were mixed and heated to a temperature of about 150°C for about 30 minutes. The resultant fluxing composition was applied with a hypodermic needle onto an assembled component lead in a plated-through hole of a circuitboard and soldered. The solder flux did not splatter during the soldering operation. The bright shiny solder joint which was formed has only 4.4% external joint imperfections compared to 18.1% for a widely used commercial flux. The number of internal gas pockets or voids was 3.9% compared to 46.5% for the widely used commercial flux.

We claim:

1. A nonaqueous liquid fluxing composition for use in soldering, consisting of
   between 35% and 60% by weight of a rosin fluxing agent; and
   the balance of a carrier vehicle of polypropylene glycol having an average molecular weight of between about 400 and 4000 for maintaining the composition in the liquid state thereby inhibiting volatilization and splattering of said composition during said soldering.

\* \* \* \* \*